Oct. 30, 1923.

W. H. SNIDER 1,472,692

ADVERTISING APPARATUS

Filed Feb. 16, 1923 2 Sheets-Sheet 1

W.H. Snider,
Inventor.

By C.A.Snow & Co.
Attorneys

Oct. 30, 1923.

W. H. SNIDER 1,472,692

ADVERTISING APPARATUS

Filed Feb. 16, 1923   2 Sheets-Sheet 2

W. H. Snider,
Inventor.

By C. A. Snow & Co.
Attorneys.

Patented Oct. 30, 1923.

1,472,692

UNITED STATES PATENT OFFICE.

WILLIAM H. SNIDER, OF WELCOME, NORTH CAROLINA.

ADVERTISING APPARATUS.

Application filed February 16, 1923. Serial No. 619,434.

*To all whom it may concern:*

Be it known that I, WILLIAM H. SNIDER, a citizen of the United States, residing at Welcome, in the county of Davidson and State of North Carolina, have invented a new and useful Advertising Apparatus, of which the following is a specification.

This invention relates to advertising apparatus of the type employing movable attention attracting figures.

The object of the invention is to provide such an apparatus constructed for actuation by a rotatable member in the form of a bladed propeller, operable by any suitable means.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
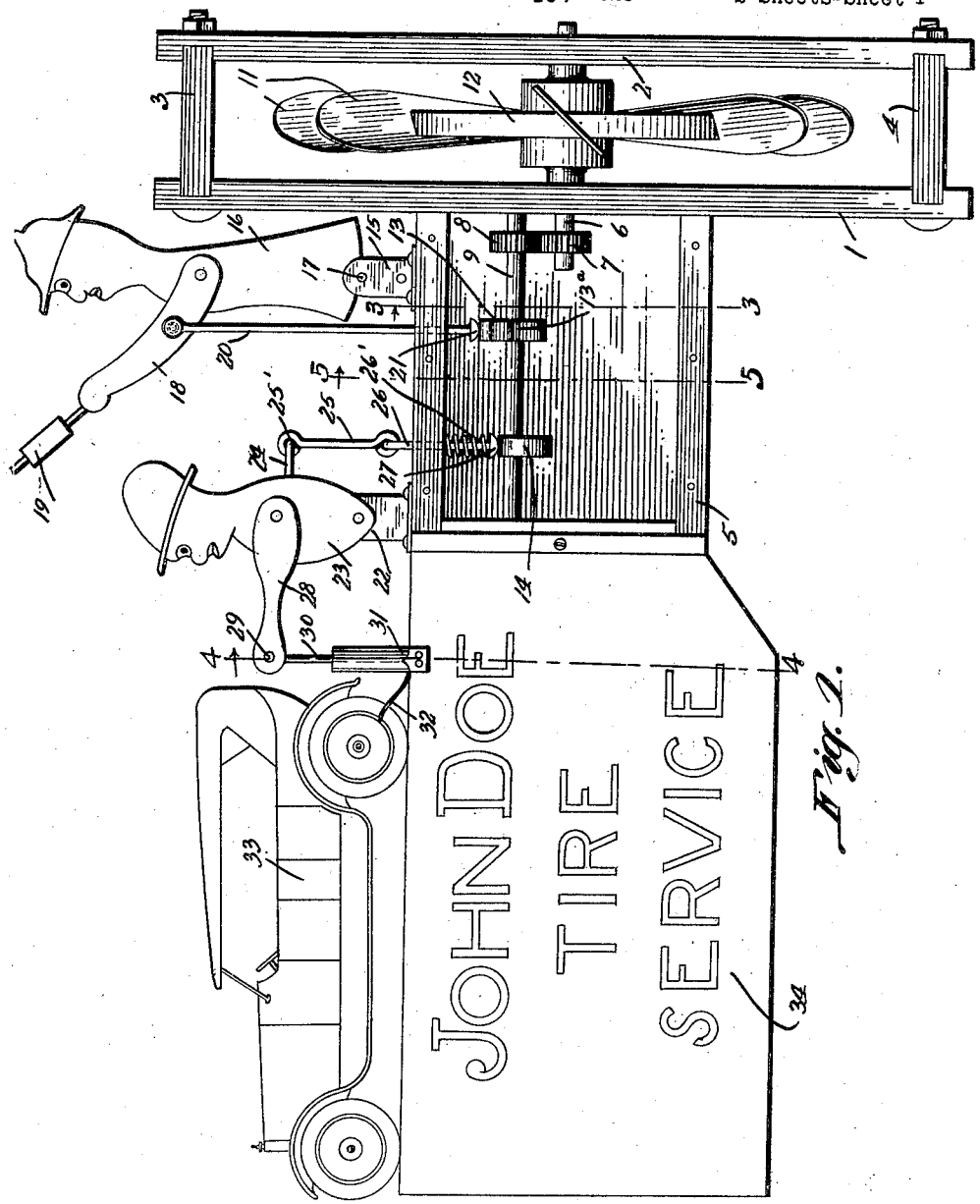
Figure 1 represents a side elevation of an apparatus constituting this invention.
Figure 2:
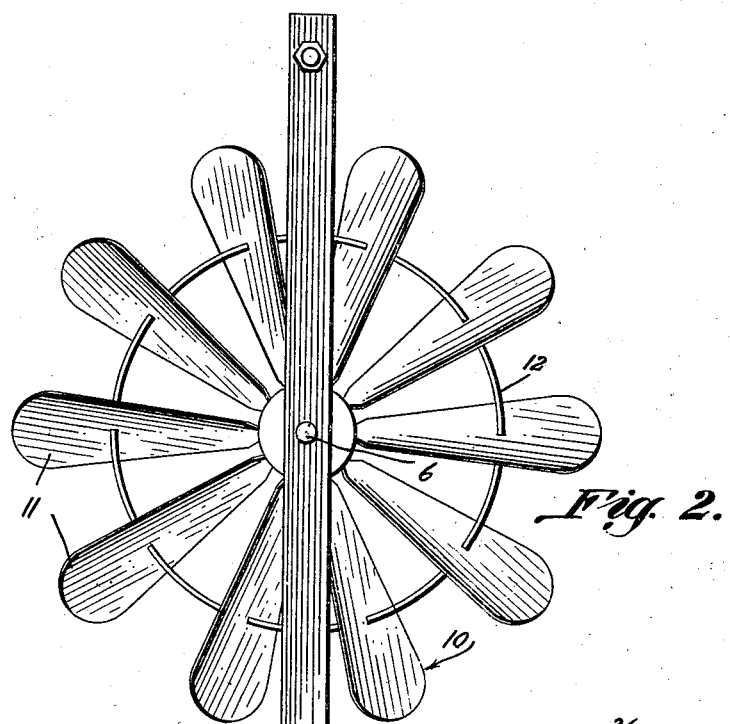
Fig. 2 is an end elevation of the propeller and the frame in which it is mounted.
Figure 3:
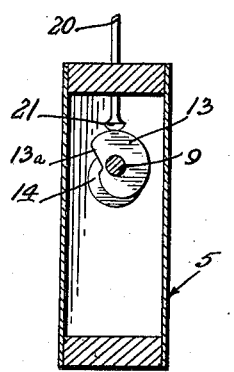
Fig. 3 is a transverse section taken on the line 3—3 of Fig. 1.
Figure 4:
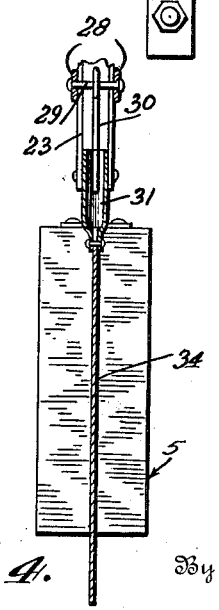
Fig. 4 is a similar view taken on the line 4—4 of Fig. 1.
Figure 5:
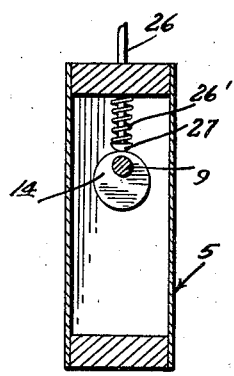
Fig. 5 is a similar view taken on the line 5—5 of Fig. 1.

In the embodiment illustrated, the apparatus constituting this invention comprises a supporting frame here shown composed of spaced uprights 1 and 2 connected by upper and lower cross bars 3 and 4. This frame may be mounted wherever desired, and has extending laterally from one upright, a casing 5 into which extends a shaft 6 journaled in the uprights 1 and 2 and on which shaft is fixedly mounted between said uprights a propeller wheel 10. This wheel 10 has a plurality of angularly disposed blades 11 which are connected by an annular bracing band 12 at points spaced inwardly from their free ends. This wheel is intended to be revolved by the wind in a manner similar to the wheel of a wind mill to rotate shaft 6.

Arranged within the casing 5 on the shaft 6 is a pinion 7 which meshes with a gear wheel 8 carried by a shaft 9 journaled in the ends of the casing 5.

Two longitudinally spaced cams 13 and 14 are fixedly mounted on shaft 9, the cam 13 being in the form of a mutilated disk, the depression 13ª therein operating in a manner presently to be described. The cam 14 is shown in the form of a disk eccentrically mounted on shaft 9 and presently to be described.

Rising from the upper face of the casing 5 near the frame which supports the propeller, is a standard 15 to the upper end of which is pivoted at 17 the body 16 of the man which is designed to move back and forth to attract attention. An arm 18 is pivotally mounted on the body 16 and carries at its outer end a hammer 19 in the form of a rolling pin which is positioned over the head of a similar man 23 located in advance of the figure 16 and pivotally mounted on an upright 22.

A rod 20 is pivotally connected at its upper end with the arm 18 of the figure 16 and extends through the top of the casing 5, being provided at its inner end with a head 21 which rests on the perimeter of the cam 13 so that when said cam is rotated, the rod will be vertically reciprocated, the recess 13ª in the cam permitting the head of the rod to enter and thus permit the rod to move downwardly, the riding of said head on the body of the cam elevating the rod.

The figure 23 has a laterally extending bar 24 which is connected by a link 25 with a rod 26 mounted to reciprocate in the top of casing 5 and having a head 27 on its inner end which rests on the perimeter of the cam 14.

The link 25 as shown, is constructed of a piece of heavy wire or of a metal rod with eyes 25′ at its ends which are loosely engaged with cooperating eyes carried by the bar 24. A coiled spring 26′ is mounted on rod 25 between the head 27 and the inner face of the casing top and exerts its tension to hold the head yieldably engaged with the perimeter of cam 14.

The figure 23 is equipped with a pair of forwardly extending arms 28 pivoted at their inner ends to said figure and connected at their front or outer ends by a pin 29. A plunger rod 30 is carried by the pin 20 and extends into a pump casing 31 and is designed to reciprocate therein and is intended to simulate a pneumatic pump having an air tube 32 connecting said casing with a tire of a car 33 which is mounted on the upper edge of a plate 34 which plate extends longitudinally from the front end of the casing 5.

The plate 34 may be of any desired size as may also the other parts of the apparatus, and is designed to contain advertising matter to be displayed.

In the use of this apparatus, the parts being in the position shown in Fig. 1, the propeller 16 is revolved by any suitable means, preferably by air currents, and the revolution of this wheel rotates the shaft 9 through the pinion and gear connection between it and shaft 6. This turning of shaft 9 causes the cams 13 and 14 which are fixed thereto to rotate with it and through the rods 20 and 26 actuate the figures 16 and 23. The reciprocation of rod 20 causes figure 16 to swing back and forth on its pivot 17 and the arm 18 to be raised and lowered whereby the rolling pin 19 is brought into striking engagement with the head of the figure 23. Simultaneously, with this striking movement of figure 16, figure 23 moves forward and backward simulating a pumping action on the plunger 30.

This movement of these figures attracts the attention of passers-by to the apparatus, calling their attention to the advertising matter contained on plate 34.

From the above description it will be obvious that this apparatus may be cheaply constructed and readily mounted at any desired point and may depend entirely upon the wind for actuating the figures or the propeller 10 may be driven by an electric fan or otherwise.

Various changes in the form, shape, proportion and other minor details of construction may be made without departing from the principle or sacrificing any of the advantages of the claimed invention.

I claim:—

1. In an apparatus of the class described, a supporting structure including a casing having a shaft extending therethrough, a wind wheel mounted outside said casing and geared to rotate said shaft, cams carried by said shaft, movable figures mounted on said casing, rods connected with said figures and having heads engaged with said cams whereby the rotation of the shaft will actuate the figures.

2. In an apparatus of the class described, a supporting structure including a casing having a shaft extending therethrough, a wind wheel mounted outside said casing and geared to rotate said shaft, cams carried by said shaft, movable figures mounted on said casing, rods having heads bearing on the perimeters of said cams and pivotally connected with movable parts of the figures whereby rotation of the shaft will actuate the figures.

In testimony that I claim the foregoing as my own, I have hereto affixed my signature in the presence of two witnesses.

WILLIAM H. SNIDER.

Witnesses:
 MUNCY O. HAYNES,
 CAN O. PICKETT.